United States Patent
Shpiner et al.

(10) Patent No.: US 10,990,447 B1
(45) Date of Patent: Apr. 27, 2021

(54) SYSTEM AND METHOD FOR CONTROLLING A FLOW OF STORAGE ACCESS REQUESTS

(71) Applicant: LIGHTBITS LABS LTD., Kfar Saba (IL)

(72) Inventors: Alexander Shpiner, Nesher (IL); Abel Alkon Gordon, Haifa (IL); Sagi Grimberg, Kfar Saba (IL)

(73) Assignee: Lightbits Labs Ltd., Kfar Saba (IL)

( * ) Notice: Subject to any disclaimer, the term of this patent is extended or adjusted under 35 U.S.C. 154(b) by 109 days.

(21) Appl. No.: 16/033,326

(22) Filed: Jul. 12, 2018

(51) Int. Cl.
| | |
|---|---|
| *G06F 15/16* | (2006.01) |
| *G06F 9/50* | (2006.01) |
| *H04L 29/08* | (2006.01) |
| *H04L 12/911* | (2013.01) |
| *H04L 12/925* | (2013.01) |
| *H04L 12/927* | (2013.01) |
| *H04L 29/06* | (2006.01) |

(52) U.S. Cl.
CPC .......... *G06F 9/5016* (2013.01); *H04L 47/722* (2013.01); *H04L 47/805* (2013.01); *H04L 47/821* (2013.01); *H04L 63/10* (2013.01); *H04L 67/1097* (2013.01); *H04L 67/322* (2013.01)

(58) Field of Classification Search
CPC ... G06F 9/5016; H04L 47/722; H04L 47/805; H04L 47/821; H04L 63/10; H04L 67/1097; H04L 67/322
USPC ........................................ 709/225, 226, 227
See application file for complete search history.

(56) References Cited

U.S. PATENT DOCUMENTS

| | | | | |
|---|---|---|---|---|
| 6,044,062 A | * | 3/2000 | Brownrigg | H04L 29/06 370/238 |
| 6,488,209 B1 | * | 12/2002 | Hunt | G06Q 30/02 235/462.15 |
| 6,990,531 B2 | * | 1/2006 | Vange | G06F 9/5027 709/240 |
| 7,324,555 B1 | * | 1/2008 | Chen | H04N 7/17336 348/E5.008 |

(Continued)

OTHER PUBLICATIONS

Shuihai Hu et al, "Deadlocks in Datacenter Networks: Why Do They Form, and How to Avoid Them", HotNets-XV, Nov. 9-10, 2016, Atlanta, GA, USA.

(Continued)

*Primary Examiner* — Thu Ha T Nguyen
(74) *Attorney, Agent, or Firm* — Pearl Cohen Zedek Latzer Baratz LLP

(57) ABSTRACT

A method and a system for controlling the access of a plurality of client computers to storage media, the system including: a processor, a Random-Access Memory (RAM) device; and a Network Interface Controller (NIC), configured to establish a plurality of connections with the clients. The processor may dynamically allocate a buffer memory space to each connected client computer on the RAM device, and the NIC may be configured to receive at least one storage access request from at least one client, over at least one computer network connection. The RAM device may accumulate data of the at least one storage access request in the buffer allocated to the respective connected client computer, and the processor may be configured, upon completion of the accumulation of data, to propagate the buffered data to at least one storage device of the storage media.

28 Claims, 4 Drawing Sheets

(56) References Cited

U.S. PATENT DOCUMENTS

| | | | | |
|---|---|---|---|---|
| 7,373,438 | B1* | 5/2008 | DeBergalis | G06F 3/0611 707/999.001 |
| 7,406,473 | B1* | 7/2008 | Brassow | H04L 67/1097 |
| 7,586,944 | B2* | 9/2009 | Messick | H04L 41/0893 370/468 |
| 7,779,142 | B1* | 8/2010 | Greene | H04L 12/2874 709/232 |
| 2001/0037406 | A1* | 11/2001 | Philbrick | H04L 29/06 709/250 |
| 2002/0091844 | A1* | 7/2002 | Craft | H04L 69/18 709/230 |
| 2003/0195919 | A1* | 10/2003 | Watanuki | H04L 29/12462 718/105 |
| 2004/0044770 | A1* | 3/2004 | Messick | H04L 29/06 709/226 |
| 2014/0321274 | A1* | 10/2014 | Gahm | H04L 47/31 370/231 |
| 2015/0319086 | A1* | 11/2015 | Tripathi | H04L 45/64 370/254 |
| 2016/0255016 | A1* | 9/2016 | Miller | H04L 47/225 709/217 |
| 2017/0010919 | A1* | 1/2017 | Yerfule | G06F 3/061 |
| 2017/0177221 | A1* | 6/2017 | Trehan | G06F 3/061 |
| 2018/0314847 | A1* | 11/2018 | Yeo | G06F 21/6227 |
| 2019/0007339 | A1* | 1/2019 | Bao | G06F 3/067 |
| 2019/0132257 | A1* | 5/2019 | Zhao | G06F 9/5044 |
| 2020/0112520 | A1* | 4/2020 | Desai | H04L 47/783 |

OTHER PUBLICATIONS

InfiniBand™ Architecture Specification Release 1.2, vol. 1, Section 9.7.7.2, Nov. 2007, 1727 Pages.

\* cited by examiner

SYSTEM AND METHOD FOR CONTROLLING A FLOW OF STORAGE ACCESS REQUESTS

FIELD OF THE INVENTION

The present invention relates generally to management of storage systems. More specifically, the present invention relates to controlling a flow of storage access requests.

BACKGROUND OF THE INVENTION

Disaggregated storage systems consist of storage consumers, commonly referred to as "clients" or "initiators", and storage modules, commonly referred to as "servers" or "targets". Storage servers may manage one or more storage devices, such as Solid-State Drives (SSDs), and the like.

Storage consumers (e.g., clients) may be connected to the storage targets (e.g., servers) and may request access (e.g., read-access or write-access) to storage media therefrom, e.g., via a computer network such as a Local Area Network (LAN) or a Wide Area Network (WAN).

When traversing the network, the data conveyed between the servers and clients may be encapsulated in packets and may be transmitted using a standard network protocol such as Transmission Control Protocol over Internet Protocol (TCP/IP), or a non-standard (e.g., a proprietary) network protocol.

One important performance parameter of the storage system is the latency of request completion, i.e., the time it takes between sending a data storage access request (e.g., a write request or a read request) from the client to the server, until an acknowledgment is received back on the client's side.

Communicating over the computer network may cause packets to drop in the event of communication congestion. Such events may incur an increase of the command completion latency and a decrease of overall system throughput, due to long retransmission timeouts and due to subsequent reduction of transmission rate of TCP-based transport.

Disaggregated storage target devices may use a memory unit to temporary store arriving data before committing it to non-volatile media. The intermediate storing may be used for staging and possibly further processing of data before committing the data to the non-volatile media.

As known to persons skilled in the art, common practice usually includes receiving data packets from the computer network by a Network Interface Controller (NIC) and placing the data payload in an RX ring buffer. A first process of the server's operating system may allocate memory space on the RX ring buffer for storage of the incoming data payload, and a second process may poll the data from the RX ring, processes it, and commit it to the storage media. If the rate of data commission is lower than the rate of data injection from the network, the RX ring buffer may become full to the extent that subsequent data packets may be dropped by the NIC.

Conventional networking stacks of operating systems may copy the payload data of incoming storage access requests packets to a plurality of receiving buffers, each dedicated to a specific network connection, associated with a specific client. The server may notify the client of available space in the respective receiving buffer, to prevent the receiving buffer from filling up. For example, when data write commands are enveloped in TCP packets, the server may use the "window" field in a TCP acknowledge message to notify the client of the available memory space. However, such solutions may not be adapted to prevent data congestion and data loss due to RX buffer overflow in the Rx buffer and may be wasteful by statically allocating receiving buffers' memory space to each connected client computer.

An example for a commercially available end-to-end flow control implementation is Infiniband's RDMA-based flow control system. Section 9.7.7.2 of the specification http://www.afs.enea.it/asantoro/Vlr1_2_1.Release_12062007.pdf discloses protection against underflow messages by a plurality of receive queue elements, each receiving a single message, but does not disclose protection against overflow in the receiving memory.

Another example of a commercially available flow control implementation is the Priority-based Flow Control (PFC), which is specified in the IEEE 802.1Qbb draft standard, which is part of the framework for the IEEE 802.1 Data Center Bridging (DCB) interface. PFC is used to eliminate packet loss between directly attached network devices, however it requires a specific network configuration, and may cause a network traffic deadlock, as discussed in Microsoft's publication: https://www.microsoft.com/en-us/research/publication/deadlocks-datacenter-networks-form-avoid/

Accordingly, a system and a method for dynamic flow control of storage access requests from a plurality of connected client computers, that would: (a) prevent conditions of packet drops due to RX ring buffer congestion; and (b) exploit knowledge pertaining to client storage requests (e.g., parameters of client computer connections) to dynamically and economically allocate buffer memory space is required.

SUMMARY OF THE INVENTION

Some embodiments of the present invention include a method and a system for controlling the access of a plurality of client computers to storage media.

Embodiments of the system may include: a processor; a Random-Access Memory (RAM) device; and a Network Interface Controller (NIC), configured to establish a plurality of connections with the respective plurality of client computers.

The processor may be configured to dynamically allocate a buffer memory space to each connected client computer on the RAM device, and the NIC may be configured to receive at least one storage access request from a client computer of the plurality of client computers over at least one computer network connection.

The RAM device may be configured to accumulate data of the at least one storage access request in the buffer allocated to the respective connected client computer, and the processor may be further configured to, upon completion of the accumulation of data, propagate the buffered data to at least one storage device of the storage media.

In some embodiments, the memory space of the RAM device may be dynamically divided into at least three portions, in which the first portion may be an RX ring buffer, configured to be allocatable for serving one or more client computer connection, the second portion may be an incoming data buffer, configured to receive data of at least one storage access request, and the third portion may be a pending data portion, configured to propagate accumulated data to at least one data storage device.

The first portion of the RAM device may be dynamically divided between one or more client computer connections, according to at least one of: the number of connections, the memory space required by each connection, and the overall memory space of the RAM device.

In some embodiments, the processor may be configured to:

obtain information pertaining to available memory space on the RX ring buffer;

determine at least one parameter of an incoming storage access request from a client computer;

dynamically allocate a buffer memory space in the RX ring buffer for the incoming storage access request of the connected client computer, according to the obtained information and determined parameter; and send, via the NIC an acknowledgement message to the client computer, wherein said acknowledgement message includes the size of the allocated buffer.

The at least one parameter of the incoming storage access request may be selected from a list consisting: a status of a communication of the client computer; a data access request type; and a required data storage allocation size.

The storage access request may be enveloped within a Transmission Control Protocol (TCP) packet, and the size of the allocated buffer may be conveyed in a window field of a TCP acknowledgement message.

The at least one storage access request may be enveloped within a TCP packet, and may include a protocol layer command. The protocol layer command may include a command length value, and the processor may be configured to extract the command length value, to determine the required data storage allocation size.

In some embodiments, the processor may be further configured to:

monitor the amount of accumulated data pertaining to at least one connected client computer in at least one portion of the RAM device's memory space; and dynamically allocate the buffer memory space for the incoming storage access request according to the monitored amount of accumulated data.

The processor may be configured to monitor the amount of accumulated data in at least the third portion of the RAM device's memory space by at least one of: repetitive polling, an asynchronous interrupt and a synchronous interrupt.

The processor may be configured to monitor incoming client storage access requests over a connection of at least one client computer, obtain a status of a connection of the at least one client computer, and dynamically allocate the buffer memory space for the incoming storage access request of the connected client computer, according to the obtained status of connection.

The processor may be configured to receive a Quality of Service (QoS) parameter pertaining to at least one connected client computer, and wherein the processor may be further configured to dynamically allocate the buffer memory space for the incoming storage access request according to the received QoS parameter.

The processor may be configured to receive an overhead threshold and allocate the buffer memory space for the incoming storage access request of the connected client computer according to the received overhead threshold.

The processor may be further configured to:

receive a plurality of communication messages from connected clients via the NIC;

determine a first percentage of messages that are not storage access request messages from the plurality of received messages; and dynamically allocate the buffer memory space for at least one incoming storage access request of the connected client computer, according to the determined first percentage.

The processor may be further configured to:

receive a plurality of communication messages from connected clients via the NIC;

determine a second percentage of header overhead of the plurality of received messages; and dynamically allocate the buffer memory space for at least one incoming storage access request of the connected client computer, according to the determined second percentage.

In some embodiments, the total memory space of the RAM device may be in the order of X Mega-Byte (MB), and wherein the total rate of incoming storage access requests may be in the order of Y Mega bit per second (Mbps).

Some embodiments of the present invention include a method of controlling the access of a plurality of client computers to storage media over a plurality of computer network connections.

Embodiments of the method may include:

establishing a plurality of connections with the respective plurality of client computers by an NIC;

dynamically allocating, by a processor, a buffer memory space to each connected client computer on a RAM device;

receiving, by the NIC, at least one storage access request from a client computer over at least one computer network connection;

accumulating, by the RAM device, data of the at least one storage access request in the buffer allocated to the respective connected client computer; and propagating, by the processor, the buffered data to at least one storage device of the storage media, when the accumulation of data is complete.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
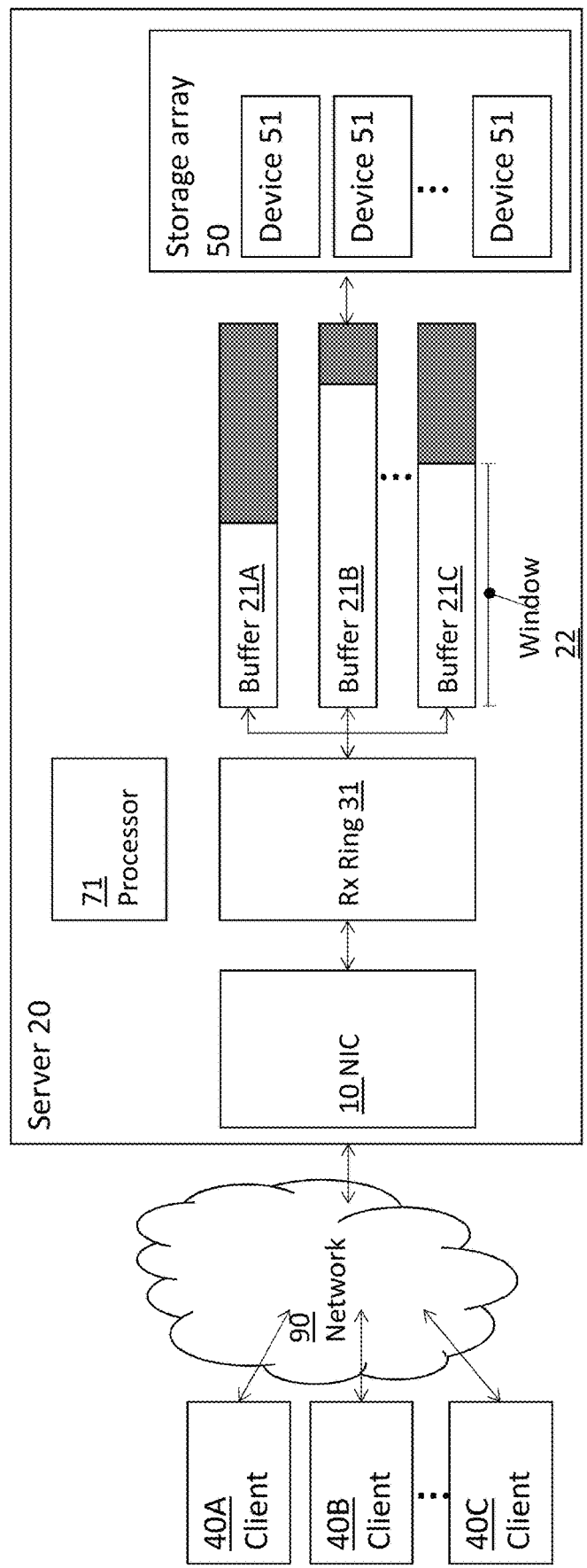
FIG. 1 is a block diagram, depicting an example for a common implementation of a flow control system for storage access requests from a plurality of client computers, as known to persons skilled in the art.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Some embodiments of the present invention provide a method and a system for controlling a flow of storage access requests from a plurality of client computers. Some embodiments may be adapted to prevent the drop of packets conveying the storage access requests within the target storage system. For example, some embodiments may be configured to prevent loss of data packets by managing clever, connection-specific memory space allocation on at least one lean RX ring buffer. This is in contrast to the current common practice of avoiding packet loss by statically allocating large receiving buffers on data storage servers.

Reference is now made to FIG. 1, which is a block diagram depicting an example for a common implementation of a flow control system for storage access requests from a plurality of client computers, as known to persons skilled in the art. Server 20 may be configured to connect to a plurality of client computers 40 (e.g., 40A, 40B and 40C), via a computer network 90, and a Network Interface Controller (NIC) 10.

Server 20 may statically allocate a buffer 21 (e.g., 21A, 21B and 21C), pertaining to a specific connection to a client. For example, buffer 21A may be dedicated to the server's 20 connection to client computer 40A. The size of buffers in common, commercial implementations may be in the excess of 100 Mega Byte (MB).

Server 20 may include an additional buffer, commonly referred to as an RX ring buffer 31, configured to accumulate at least one storage access request, including one or more data packets from NIC 10. When the reception of the at least one storage access request (e.g., a write-access request) in RX ring buffer 31 is completed (e.g., all data pertaining to the write-access request is contained in RX ring buffer 31), RX ring buffer 31 may receive a command from processor 71 (e.g., through a polling mechanism), to forward data of the received storage access request to a designated destination buffer 21. In common implementations, RX ring buffer 31 may forward a payload of at least one data packet of the storage access request to designated buffer 21.

Server 20 may include or may be associated with a storage array or storage media 50 that may be associated with a physical address space. Storage array 50 may include one or more storage devices 51 such as Solid-State Drives (SSDs), Hard Disk Drives (HDDs) and the like. Server 20 may handle data that is maintained in Storage array 50 and store the data on at least one storage device 51.

As known to persons skilled in the art, the static allocation of designated buffers 21 in server 20, disregarding properties and/or priorities of specific client connections may be wasteful in terms of memory consumption. Furthermore, if processor 71 is not fast enough in moving data from RX ring buffer 31 to the dedicated per-connection buffers 21, RX ring buffer 31 may overflow, and data packets may be dropped.

Figure 2:
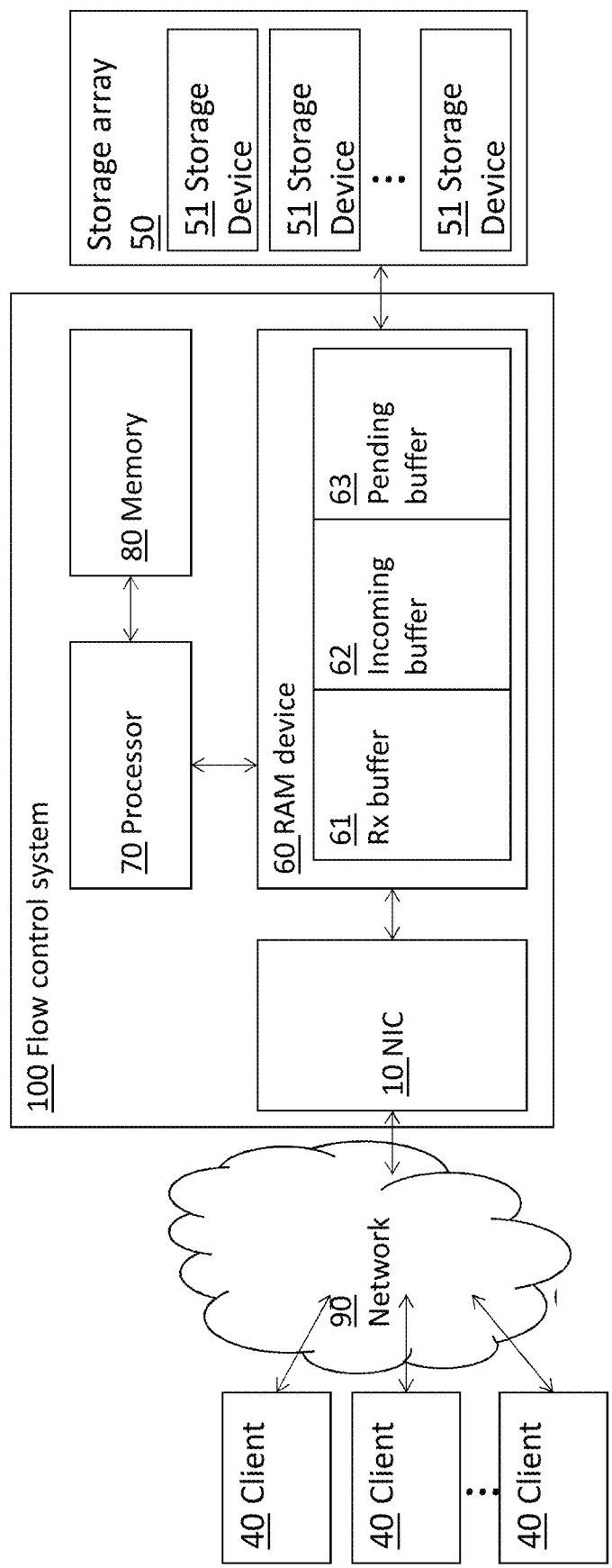
FIG. 2 is a block diagram depicting a system for flow control of storage access request messages from a plurality of client computers, according to some embodiments.

Reference is now made to FIG. 2, which is a block diagram depicting a system 100 for flow control of storage access request messages from a plurality of client computers, according to some embodiments.

System 100 may include a non-transitory memory device 80, configured to store modules of executable code, and a processor 70, associated with memory device 80, and configured to execute the at least one module of executable code. Processor 70 may be configured, upon execution of the executable code, to perform at least one method of system 100 as described herein.

System 100 may include an NIC 10, configured to establish a plurality of connections with the respective plurality of client computers 40 (e.g., 40A, 40B and 40C), via a computer network 90 (e.g., LAN, WAN, etc.), and receive at least one storage access request (e.g., a write request or a read request) therefrom, over at least one connection.

According to some embodiments, system 100 may include a Random-Access Memory (RAM) device, such as a non-volatile memory (NVM) RAM device, a Static RAM (SRAM) device, and the like.

The terms "connection" and "client computer connection" are used herein interchangeably, to refer to at least one communication channel that may be established between a client 40 and at least one storage array via NIC 10. For example, a connected client may employ a plurality of processes, and may communicate with at least one storage array over a respective plurality of ports. The specific properties of client computer connections are discussed below, in relation to Table 1.

Processor 70 may be configured to dynamically allocate a buffer memory space 61 dedicated to each client computer 40 connection on RAM device 60, as explained herein.

RAM device 60 may be configured to accumulate data of the at least one storage access request in a dedicated buffer, allocated to the respective connected client computer. For example, the storage access request (e.g., a write-access request) may be conveyed by one or more Transmission Control Protocol (TCP) packets, and the dedicated buffer may be configured to accumulate the incoming data, as explained herein.

Upon completion of the accumulation of data in the dedicated buffer, processor 70 may propagate the buffered data to at least one storage device 51 of storage media or storage array 50. For example, processor 70 may monitor the accumulated data from RAM device 60 by repetitive polling and/or by synchronous or asynchronous interrupt, as known to persons skilled in the art.

In some embodiments, processor 70 may propagate the buffered data to storage array 50 by reading it from RAM device 60 and writing it to storage array 50. In an alternative embodiment, the data may be copied from RAM device 60 to storage array 50 by Direct Memory Access (DMA), thus avoiding consumption of processor's 70 resources, such as internal memory and computing cycles.

According to experimental results, system 100 may require the total memory space of RAM memory device 60 to be in the order of several (e.g., 1-10) Mega-Bytes (MB), to efficiently support a total rate of incoming storage access requests in the order of 10-100 Giga bits per second (Gbps).

Processor 70 may obtain information pertaining to the RAM device, including for example: the total amount of available memory on the RAM device; a total number of connected clients that need to be served, and the like.

Processor 70 may monitor at least one incoming client storage access request over a connection of at least one client computer, and determine or obtain at least one parameter of an incoming storage access request associated with a specific client computer connection, such as the type of the storage access request (e.g., read/write); the size of the request (e.g., size in Bytes of the request's payload); a protocol of the request (e.g., enveloped within one or more a TCP/IP packet); a priority of at least one connected client (e.g., a high priority, a low priority, etc.); a status of at least one connected client (e.g., the frequency and/or timing of the connected client's latest storage access request), and the like.

Processor 70 may dynamically allocate a buffer memory space on the RX device for the incoming storage access request of the connected client computer, according to the obtained information and determined parameter.

For example, processor 70 may allocate more memory space in RAM device 60 when there are less connected client computers 40 to serve.

In another example, processor 70 may allocate more memory space to buffer write-access storage requests (including a data payload for storage) than to read-access storage requests.

In another example, processor 70 may allocate more memory space to handle connections of connected client computers 40 that are of higher priority than to client computers 40 that are of lower priority. For example, system 100 may receive a Quality of Service (QoS) parameter pertaining to a priority of at least one connection of a client computer, and processor 70 may be configured to dynamically allocate the buffer memory space for the incoming storage access request according to the received QoS parameter.

In yet another example, Processor 70 may monitor incoming client storage access requests over a connection of at least one client computer and obtain a status of a connection of the at least one client computer, and dynamically allocate the buffer memory space for the incoming storage access request of the connected client computer, according to the obtained status of connection. For example, processor 70 may allocate more memory space to handle connections of connected client computers 40 that require storage access more frequently, or with larger payloads than other client computers 40. Alternatively, client computers 40 that are connected via NIC 10 to system 100 but seldom send write-access requests to storage array 50 may be allocated a predefined minimal memory space in RAM device 60.

According to some embodiments, processor 70 may send, via the NIC an acknowledgement message to the client computer. The acknowledgement message may include the size of the allocated memory space in the buffer. For example, the storage access request may be enveloped within or conveyed by a TCP packet. As known to persons skilled in the art, the size of the allocated buffer may be conveyed back to client 40 in a "window" field of a TCP acknowledgement message in order to prevent the allocated memory space in the buffer from overflowing.

According to some embodiments, the memory space of RAM memory device 60, allocated in respect to each client 40 connection may be dynamically divided into three portions. The first portion may be an RX ring buffer 61, configured to be allocatable for serving one or more client computer connection. The second portion may be an incoming data buffer 62, configured to receive data of at least one storage access request. The third portion may be a pending data portion 63, configured to propagate accumulated data to at least one data storage device 51.

Figure 3:
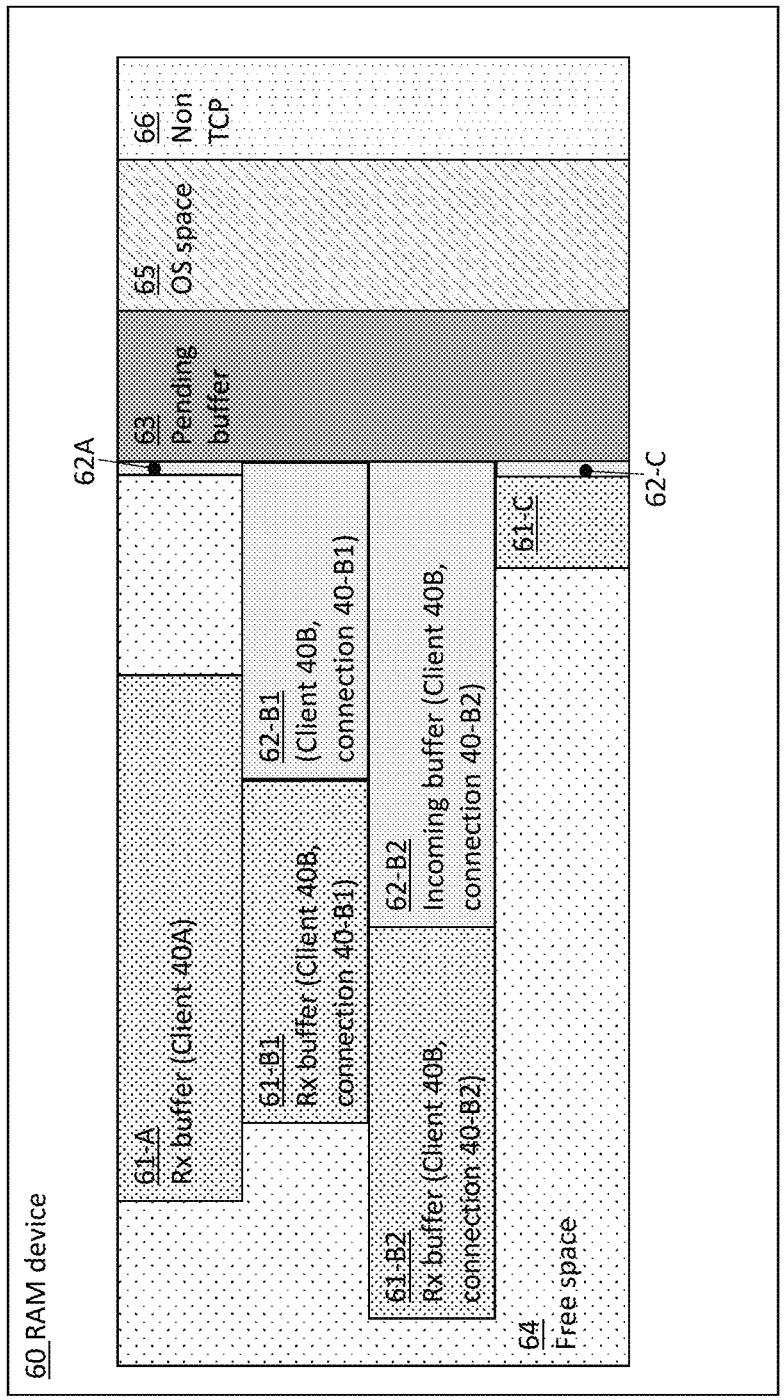
FIG. 3 is a block diagram depicting a non-restricting example of memory allocation in a RAM device, which may be included in a system for flow control of storage access request messages from a plurality of client computers, according to some embodiments.

Reference is now made to FIG. 3, which is a block diagram depicting a non-restricting example of memory allocation in RAM device 60.

In some embodiments, the position of at least one partition between each pair of adjacent portions (e.g., between the first portion and the second portion, and between the second portion and the third portion) may be dynamically altered, to reflect a condition of reception of a storage access request by RAM device 60, as explained herein.

A client computer (e.g., Client 40A) may initially communicate a storage access request to system 100, and a processor (e.g., element 70 of FIG. 2) may be configured to allocate memory from the first portion, the RX ring buffer 61, according to the obtained information and determined parameter.

The first portion 61 of the RAM device may be dynamically divided (e.g., 61-A, 61-B1, 61-B2, 61-C) between one or more client computer connections, according to at least one of: (a) the number of connections to client computers, (b) a memory space required by each connection, (c) an overall memory space of the RAM device and (d) additional restrictions, as elaborated further below.

For example, first portion 61 may be divided between 61-A (allocated for a connection associated with client 40A), 61-B1 (allocated for a first connection associated with client 40B), 61-B2 (allocated for a second connection associated with client 40B), and 61-C (allocated for a connection associated with client 40C)

A client (e.g., client 40C) may establish a connection to a storage array (e.g., 50A) via NIC 10, for example by sending an Address Resolution Protocol (ARP) frame, as known to persons skilled in the art.

Processor 70 may consequently allocate a minimal memory space for the newly established connection, to accommodate reception of a minimal sized storage access request. For example, storage array 50 may include at least one non-volatile memory (NVM) device, such as a Solid-State Drive (SSD), and the like. Storage access requests may be received from client 40 en-route storage array 50, and may include storage protocol layer commands, such as Non-Volatile Memory Express Over Fabrics (NVMeOF) commands. These storage protocol layer commands may be enveloped within TCP packets. Processor 70 may allocate a 64 Byte space in the first section (e.g., 61-C) to accommodate reception of at least one such minimal-sized, enveloped storage protocol layer command.

At this stage of initial allocation, processor 70 may also allocate a zero-sized memory space for the second portion (e.g., incoming buffer 62-C) associated with the newly established connection.

Processor 70 may receive a storage access request that may be associated with a specific connection (e.g., connection with client 40A). The received storage access request may include a protocol layer command, enveloped within a TCP packet, and may include a storage layer header. The storage layer header may include a command length value (e.g., a Scatter Gather List (SGL) length value, included in a submission queue entry).

Processor 70 may be configured to extract the command length value in order to determine the size of the required storage allocation and to allocate a memory space in RAM device 60 accordingly. For example, processor 70 may allocate the determined size of memory space in a first portion (e.g., RX buffer 61-A) associated with the respective connection (e.g., connection with client 40A).

Flow control system 100 may receive communication packets conveying data pertaining to the storage access request from at least one client and may be associated with at least one connection (e.g., client 40B, connection 40-B1) via NIC 10. The content of these packets may be stored in the second portion (e.g., incoming data buffer 62-B1), which may grow at the expense of RX ring buffer 61 (e.g., 61-B1).

When reception of a storage access request from a connection of a connected client computer (e.g., client 40B, connection 40-B2) is completed, the completed data may be moved into the third portion (e.g., pending buffer 63), at the expense of the second portion (e.g. 62-B2). Processor 70 may then reallocate a minimal memory space in the first portion for the completed connection (e.g., 61-B2), to again accommodate reception of at least one minimal-sized, enveloped storage protocol layer command, as explained above.

In some embodiments, and as depicted in FIG. 3, pending buffer 63 may be managed globally by processor 70 for all connections, and may not be associated with any specific connection of any specific connected client. In alternate embodiments, pending buffer 63 may be managed individually by processor 70 per each connection of each connected client, or any combination thereof.

Processor 70 may be configured to monitor the amount of accumulated data in at least the third portion (e.g., pending buffer 63) of the RAM device's memory space by at least one of: repetitive polling, an asynchronous interrupt and a synchronous interrupt. Processor 70 may propagate the content of the pending buffer to a storage device (e.g., element 51 of FIG. 2), and thus reclaim memory space in favor of the free space 64 of RAM device 60.

Processor 70 may monitor the amount of accumulated data pertaining to at least one connected client computer in at least one portion of the RAM device's memory space, and dynamically allocate the buffer memory space for the incoming storage access request according to the monitored amount of accumulated data.

For example, a connected client computer (e.g., client 40C) may require access (e.g., write-access) to a storage array or media (e.g., element 50 of FIG. 2), and processor may dynamically allocate a memory space respective of the client computer connection according to the available memory space in the first portion of the respective connection (e.g., RX buffer 61C).

For example, as incoming data is accumulated in incoming buffer 62-B2, the amount of allocated memory space in RX buffer 61-B2 will decrease. Processor 70 may notify a client of the decreasing amount of allocated memory space in the RX buffer (e.g., 61-B2) in an acknowledgement message per each received packet (e.g., in a "window" field of a TCP acknowledgement), as explained above.

In another example, when data is moved from pending buffer 63C to storage device 51, the amount of allocated memory space in RX buffer 61C will increase.

As known to persons skilled in the art, according to the TCP protocol, the 'window' field of a TCP acknowledgement is configured to convey a size of a TCP packet's payload (e.g., excluding a size of a TCP header). According to some embodiments, system 100 may be configured to store complete TCP packets (e.g., including a TCP header) in RAM device 60 (e.g., for the purpose of a-posteriori analysis and/or handling). To accommodate the additional required storage space, processor 70 may be configured to determine a first overhead threshold (e.g., a header threshold) percentage and allocate the buffer memory space for the incoming storage access request of the connected client computer according to the first overhead threshold percentage. For example, processor 70 may determine a threshold percentage of 90% and notify a client (e.g., Client 40C) of only 90% of the allocated storage in RX buffer 61C, to accommodate storage of entire communicated packets, including packet headers and payloads.

To determine the first overhead threshold percentage, processor 70 may:

a. Store (e.g., in memory module 80 of FIG. 2) information relating to at least one payload size of a storage access request. For example: processor 70 may accumulate a mean value or a sum value of storage access request payloads received over time. In another example, processor 70 may extract the maximal transmission unit (MTU) size associated with specific ports of NIC 10.

b. Calculate the overall size of headers of data packets. For example, processor 70 may calculate the sum of header sizes of Open Systems Interconnection (OSI) layers of the transport layer and below (e.g., TCP header size+IP header size+Ethernet header size).

c. Calculate the first overhead threshold percentage according to the relation between the calculated overall size of headers and the stored payload size information.

According to some embodiments, system 100 may be configured to buffer incoming communication messages, that may not include storage access requests, from a client device, (e.g., for the purpose of a-posteriori analysis and/or handling). To accommodate the additional required storage space, processor 70 may receive a plurality of communication messages from at least one connected client via NIC 10; determine a second threshold percentage of messages that are not storage access request messages from the plurality of received messages; and dynamically allocate the buffer memory space for at least one incoming storage access request of the connected client computer, according to the determined first percentage.

For example, processor 70 may receive a plurality of storage access request messages, enveloped within TCP packets from at least one client (e.g., element 40 of FIG. 2). Processor 70 may also receive a plurality of User Datagram Protocol (UDP) packets, that may or may not be related to storage access requests from the at least one client 40. Processor 70 may determine a second overhead threshold percentage (e.g., 80%) reflecting the percentage of acknowledgeable TCP packets from the overall plurality of packets received from client 40. Processor 70 may then notify client 40 of only 80% of the allocated storage in a respective RX buffer (e.g., element 61 of FIG. 2), to accommodate storage of non-acknowledgeable communicated packets (e.g., the UDP packets) on RAM device 60.

Processor 70 may reserve the memory space dedicated for messages that may not include storage access requests in non-TCP portion 66 of RAM device 60. According to some embodiments, the allocated memory space of non-TCP portion 66 may be dynamically managed by processor 70, according to value of the determined second overhead threshold percentage. In some embodiments, non-TCP portion 66 may be individually managed by processor 70 per each connection and may be included within the first portion (e.g., RX buffer 61-A) of a respective connection.

To determine the second overhead threshold percentage, processor 70 may:

a. Accumulate (e.g., in memory module 80 of FIG. 2) a first historic information relating to at least one packet size of a storage access request. For example, processor 70 may accumulate a sum value of storage access request packet sizes associated with a specific connected client computer;

b. Accumulate (e.g., in memory module 80 of FIG. 2) a second historic information relating to at least one packet size of an incoming communication message, that may not include a storage access requests, including for example network control traffic packets such as ARP frames, Dynamic Host Configuration Protocol (DHCP) frames, and the like; and c. Calculate the second overhead threshold percentage according to the relation between the first historic packet size information and the second historic packet size information.

According to some embodiments, processor 70 may dynamically allocate an Operating System (OS) memory space 65 on RAM device 60. For example, processor may require storage space to perform at least one task associated with the management of flow control system 100. Processor 70 may allocate the required memory space 65 according to the requirements of the task, and free the allocated space when the task is completed, as known to persons skilled in the art.

In some embodiments, processor 70 may monitor the allocations of memory space, and/or notification thereof to respective client computers, and ensure that at any stage the total amount of allocated space does not exceed the entire available memory in RAM device 60. For example, processor 70 may maintain an allocation table (e.g., in memory device 80 of FIG. 2), including properties of allocated memory space per each connection of a client computer, as shown in Table 1, below:

TABLE 1

| Connection ID (5-tuple) | Allocated buffer (KB) | Required buffer (KB) | Remaining write data (KB) |
|---|---|---|---|
| ... | ... | ... | ... |
| ... | ... | ... | ... |

In Table 1, each row may represent allocation properties respective of a specific client computer connection. Each connection may be uniquely identified by a connection identification number (ID, first column).

In some embodiments, the connection ID may include, for example, at least part of a 5-tuple set (e.g., source IP address and port number, destination IP address and port number and an identifier of a protocol, such as TCP), as known to persons skilled in the art.

A second column of Table 1 (e.g., "Allocated buffer") may contain the monitored value of allocated memory space per each connection (e.g., in Kilo-Bytes (KB)). In some embodiments, processor 70 may allocate one or more instances of memory space in RAM device 60 according to individual connection IDs, as dictated by a respective "Allocated buffer" entry. For example, processor 70 may allocate memory spaces, respective to different port numbers and/or destination addresses, to support allocation of storage space for different processes that are executed on a client computer. In another embodiment, processor 70 may keep track of the required memory space for allocation according to the sum of entries in the "Allocated buffer" column, and only perform the actual allocation of memory space when a respective storage access request is received.

As explained above, this value may change dynamically, as communication packets arrive from NIC 10. Processor 70 may monitor the values in this column to ensure that the overall allocated memory space would not exceed the memory space available on RAM device 60.

A third column of Table 1 (e.g., "Required buffer") may contain the amount of memory space (e.g., in KB) required by a client on a specific connection. Processor 70 may use this value as a top threshold for memory allocation per the specific connection. Alternately, processor 70 may use a second threshold that may be lower than the "Required buffer" value, to restrict the client from using an allocated memory that exceeds the second threshold.

In some embodiments, processor 70 may monitor the amount of incoming data on packets associated with a specific connection and adjust (e.g., decrease) the value of the "Required buffer" accordingly.

A fourth column of Table 1 (e.g., "Remaining write data) may contain the amount of memory space already consumed by buffered packets (e.g., in KB) of a specific connection in RAM device 60

Figure 4:
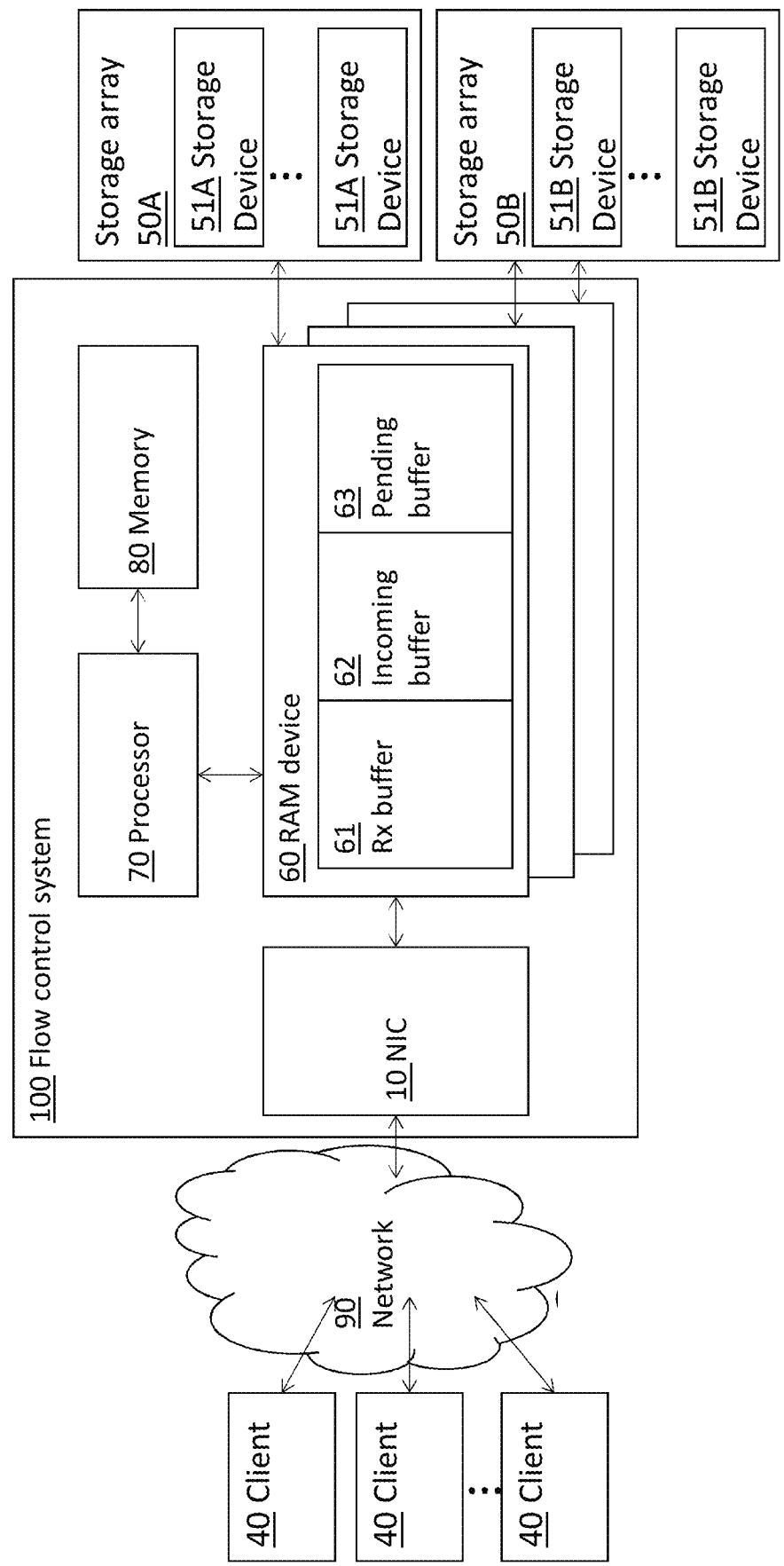
FIG. 4 is a block diagram depicting a system for flow control of storage access request messages from a plurality of client computers, according to some embodiments.

Reference is now made to FIG. 4, which is a block diagram depicting a system 100 for flow control of storage access request messages from a plurality of client computers, according to some embodiments. As shown in FIG. 4, system 100 may include a plurality of RAM device 60 instances.

In some embodiments, processor 70 may configure each RAM 60 instance to handle a subset of client computer connections. For example, connections associated with a first client computer may be buffered on a first instance of a RAM 60 device, and connections associated with a second client computer may be buffered on a second instance of a RAM 60 device.

In some embodiments, processor 70 may associate each RAM 60 instance to one or more instances of storage arrays 50. For example, processor 70 may be configured to: (a) propagate data that may be accumulated on a first pending buffer (e.g., element 63C of FIG. 3) to a first storage device (e.g. 51A) of a first storage array (e.g., 50A), and (b) propagate data that may be accumulated on a second pending buffer to a second storage device (e.g., 51B) of a second storage array (e.g., 50B).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for controlling a flow of storage access requests from a plurality of client computers to storage media, the system comprising:
   a Network Interface Controller (NIC) configured to establish a plurality of connections with the plurality of client computers, and receive at least one storage access request from at least one client computer connection; and
   a processor, configured to:
      dynamically allocate, on a Random Access Memory (RAM) device, a buffer memory space, dedicated to each, specific client computer connection;
      convey a size of an allocated buffer, on the RAM device, to at least one respective, connected client computer, to prevent said allocated buffer from overflowing, and accumulate, in said buffer, data of at least one storage access request received via the respective client computer connection; and
      upon completion of the accumulation of data, propagate the buffered data to at least one storage device of the storage media, so as to control flow of storage access requests of the plurality of client computers to the storage media.

2. The system of claim 1, wherein the buffer memory space of the RAM device, allocated in respect to each client connection, is dynamically divided into at least three portions, wherein the first portion is an RX ring buffer, configured to be allocatable for serving a client computer connection, and wherein the second portion is an incoming data buffer, configured to receive data of at least one storage access request from the client computer connection, and wherein the third portion is a pending data portion, configured to propagate accumulated data to at least one data storage device.

3. The system of claim 2, wherein the first portion of the RAM device is dynamically divided between one or more client computer connections, according to the overall memory space of the RAM device and at least one of: the number of connections and the memory space required by each connection.

4. The system of claim 2, wherein after establishing a connection with a client computer, the processor is configured to dynamically allocate a buffer memory space by:
   allocating a minimal memory space for the newly established connection, to accommodate reception of a minimal sized storage access request; and
   allocating a zero-sized memory space in the second portion, associated with the newly established connection.

5. The system of claim 2, wherein the processor is configured to dynamically allocate a buffer memory space by:
   receiving a storage access request from a specific client connection;
   determining the size of a required storage, based on a header of the storage access request; and
   allocating the determined size in the first portion associated with the respective connection.

6. The system of claim 5, wherein the processor is further configured to:
   receive data of storage access requests, associated with at least one client connection; and
   store said data in the second portion, allowing the second portion to grow at the expense of the first portion.

7. The system of claim 6, wherein the processor is further configured to move content of the second portion into the third portion at the expense of the second portion when reception of a storage access request from a connected client is completed.

8. The system of claim 3, wherein the processor is further configured to:
   obtain information pertaining to available memory space on the RX ring buffer;
   determine at least one parameter of an incoming storage access request from a client computer;
   dynamically allocate a buffer memory space in the RX ring buffer for the incoming storage access request of the connected client computer, according to the obtained information and determined parameter; and
   send, via the NIC an acknowledgement message to the client computer, wherein said acknowledgement message comprises the size of the allocated buffer.

9. The system of claim 8, wherein the at least one parameter of the incoming storage access request is selected from a list consisting: a status of a communication of the client computer; a data access request type; and a required data storage allocation size.

10. The system of claim 9, wherein the storage access request is enveloped within a Transmission Control Protocol (TCP) packet, and wherein dynamically allocating a buffer memory space comprises conveying the size of the allocated buffer in a window field of a TCP acknowledgement message.

11. The system of claim 9, wherein at least one storage access request is enveloped within a TCP packet, and comprises a protocol layer command, and wherein the protocol layer command comprises a command length value, and wherein the processor is configured to extract the command length value, to determine the required data storage allocation size.

12. The system of claim 9, wherein the processor is further configured to:
   monitor the amount of accumulated data pertaining to at least one connected client computer in at least one portion of the RAM device's memory space; and
   dynamically allocate the buffer memory space for the incoming storage access request according to the monitored amount of accumulated data.

13. The system of claim 12, wherein the processor is further configured to monitor incoming client storage access requests over a connection of at least one client computer, obtain a status of a connection of the at least one client computer, and dynamically allocate the buffer memory space for the incoming storage access request of the connected client computer, according to the obtained status of connection.

14. The system of claim 12, wherein the processor is further configured to receive a Quality of Service (QoS) parameter pertaining to a priority of at least one connection of a client computer, and wherein the processor is further configured to dynamically allocate the buffer memory space for the incoming storage access request according to the received QoS parameter.

15. The system of claim 12, wherein the processor is further configured to receive an overhead threshold and allocate the buffer memory space for the incoming storage access request of the connected client computer according to the received overhead threshold.

16. The system of claim 12, wherein the processor is further configured to:
   receive a plurality of communication messages from connected clients via the NIC;

determine a first percentage of messages that are not storage access request messages from the plurality of received messages; and dynamically allocate the buffer memory space for at least one incoming storage access request of the connected client computer, according to the determined first percentage.

17. The system of claim 12, wherein the processor is further configured to:

receive a plurality of communication messages from connected clients via the NIC;

determine a second percentage of header overhead of the plurality of received messages; and dynamically allocate the buffer memory space for at least one incoming storage access request of the connected client computer, according to the determined second percentage.

18. A method of controlling the access of a plurality of client computers to storage media over a plurality of computer network connections, the method comprising:

establishing a plurality of connections with the respective plurality of client computers by an NIC;

dynamically allocating, by a processor, a buffer memory space, dedicated to each, specific client computer connection on a RAM device;

receiving, by the NIC, at least one storage access request from a client computer connection;

conveying a size of an allocated buffer, on the RAM device, to at least one respective, connected client computer, to prevent said allocated buffer from overflowing and accumulating, in said buffer, data of at least one storage access request received via the respective client computer connection: and propagating, by the processor, the buffered data to at least one storage device of the storage media, when the accumulation of data is completed.

19. The method of claim 18, further comprising dynamically dividing the buffer memory space of the RAM device, allocated in respect to each client connection, into at least three portions, wherein the first portion is an RX ring buffer, configured to be allocatable for serving a client computer connection, and wherein the second portion is an incoming data buffer, configured to receive data of at least one storage access request from the client computer connection, and wherein the third portion is a pending data portion, configured to propagate accumulated data to at least one data storage device.

20. The method of claim 19, further comprising dynamically dividing the first portion of the RAM device between one or more client computer connections, according to the memory space of the RAM device and at least one of: the number of connections and the memory space required by each connection.

21. The method of claim 20, further comprising:

obtaining, by the processor, information pertaining to available memory space on the RX ring buffer;

determining, by the processor, at least one parameter of an incoming storage access request from a client computer;

dynamically allocating, by the processor, a buffer memory space in the RX ring buffer for the incoming storage access request of the connected client computer, according to the obtained information and determined parameter; and sending, by the processor, via the NIC, an acknowledgement message to the client computer, wherein said acknowledgement message comprises the size of the allocated buffer.

22. The method of claim 21, wherein the at least one parameter of the incoming storage access request is selected from a list consisting: a status of a communication of the client computer; a data access request type; and a required data storage allocation size.

23. The method of claim 22, further comprising enveloping at least one storage access request within a TCP packet, wherein the at least one storage access request comprises a protocol layer command, and wherein the protocol layer command comprises a command length value.

24. The method of claim 22, further comprising:

monitoring, by the processor, the amount of accumulated data pertaining to at least one connected client computer in at least one portion of the RAM device's memory space; and dynamically allocating, by the processor, the buffer memory space for the incoming storage access request according to the monitored amount of accumulated data.

25. The method of claim 24, further comprising:

monitoring, by the processor, incoming client storage access requests over a connection of at least one client computer;

obtaining, by the processor, a status of a connection of the at least one client computer; and dynamically allocating, by the processor, the buffer memory space for the incoming storage access request of the connected client computer, according to the obtained status of connection.

26. The method of claim 24, further comprising: receiving an overhead threshold and dynamically allocating, by the processor, the buffer memory space for the incoming storage access request of the connected client computer according to the received overhead threshold.

27. The method of claim 23, further comprising extracting, by the processor, the command length value, to determine the required data storage allocation size.

28. The method of claim 27, further comprising enveloping the storage access request within a TCP packet, and wherein dynamically allocating a buffer memory space comprises conveying the size of the allocated buffer in a window field of a TCP acknowledgement message.

* * * * *